United States Patent
Heidasch

(10) Patent No.: US 8,798,969 B2
(45) Date of Patent: Aug. 5, 2014

(54) MACHINE LEARNING FOR A MEMORY-BASED DATABASE

(75) Inventor: Robert Heidasch, Speyer (DE)

(73) Assignee: SAP AG, Walldorf (DE)

( * ) Notice: Subject to any disclaimer, the term of this patent is extended or adjusted under 35 U.S.C. 154(b) by 279 days.

(21) Appl. No.: 13/432,770

(22) Filed: Mar. 28, 2012

(65) Prior Publication Data

US 2013/0262074 A1     Oct. 3, 2013

(51) Int. Cl.
    *G06F 17/50*     (2006.01)
    *G06F 9/445*     (2006.01)

(52) U.S. Cl.
    USPC .............. 703/2; 703/22; 703/24; 717/114; 717/124; 706/12; 706/55

(58) Field of Classification Search
    CPC .... G06F 17/5009; G06F 17/5022; G06F 3/06
    USPC ......... 703/2, 6, 22; 706/12, 55; 717/114, 124; 705/1
    See application file for complete search history.

(56) References Cited

U.S. PATENT DOCUMENTS

| | | | | |
|---|---|---|---|---|
| 7,313,773 | B1 * | 12/2007 | Braun et al. | 716/103 |
| 7,624,383 | B2 * | 11/2009 | Barr et al. | 717/135 |
| 7,966,078 | B2 * | 6/2011 | Hoffberg et al. | 700/17 |
| 7,987,003 | B2 * | 7/2011 | Hoffberg et al. | 700/17 |
| 8,516,266 | B2 * | 8/2013 | Hoffberg et al. | 713/189 |
| 2007/0288693 | A1 * | 12/2007 | Rajan et al. | 711/114 |
| 2008/0120129 | A1 * | 5/2008 | Seubert et al. | 705/1 |
| 2010/0280814 | A1 * | 11/2010 | Rabinovitch et al. | 703/16 |
| 2011/0276944 | A1 * | 11/2011 | Bergman et al. | 717/124 |
| 2013/0110576 | A1 * | 5/2013 | Roy et al. | 705/7.26 |

\* cited by examiner

*Primary Examiner* — Thai Phan
(74) *Attorney, Agent, or Firm* — Schwegman, Lundberg & Woessner, P.A.

(57) ABSTRACT

An enterprise database is accessed through semantic labels to develop models that enhance the database. A database of business objects is accessed, the business objects including data tables that relate semantic labels to enterprise data. One or more rules that use the semantic labels are applied to select enterprise data corresponding to the semantic labels. The selected enterprise data are used to determine modeling parameters that relate a semantic-label input set to a semantic-label output set, the semantic-label input set and the semantic-label output set each including at least one of the semantic labels. The modeling parameters are used to generate a simulation table that predicts an operational range of at least one business object corresponding to at least one of the semantic labels. The at least one business object is augmented in the database by including the simulation table in the at least one business object.

20 Claims, 6 Drawing Sheets

MACHINE LEARNING FOR A MEMORY-BASED DATABASE

CROSS REFERENCE TO RELATED APPLICATIONS

This application is related to U.S. application Ser. No. 13/288,730, filed Nov. 3, 2011, which is incorporated herein by reference in its entirety.

FIELD

The present disclosure relates to data searches and related modeling generally and more particularly to data searches and related modeling for database systems.

BACKGROUND

Generally, a search engine is a program that is designed to search for information from a variety of sources of data, such as the World Wide Web and File Transfer Protocol (FTP) servers. Many of these conventional search engines are designed to conduct searches based on matching of keywords. For example, a conventional search engine searches documents for keywords, which are specified by a user, and returns a list of documents where the keywords are found.

However, conventional search engines often do not take into account the semantic meaning of the keywords. As a result their effectiveness may be limited in particular for cases where the data values have been restricted to a specialized context such as enterprise data. Furthermore, related modeling may be impaired when meaningful data relationships are correspondingly inaccessible. Thus, there is a need for improved methods and related systems for accessing data structures and developing related models.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
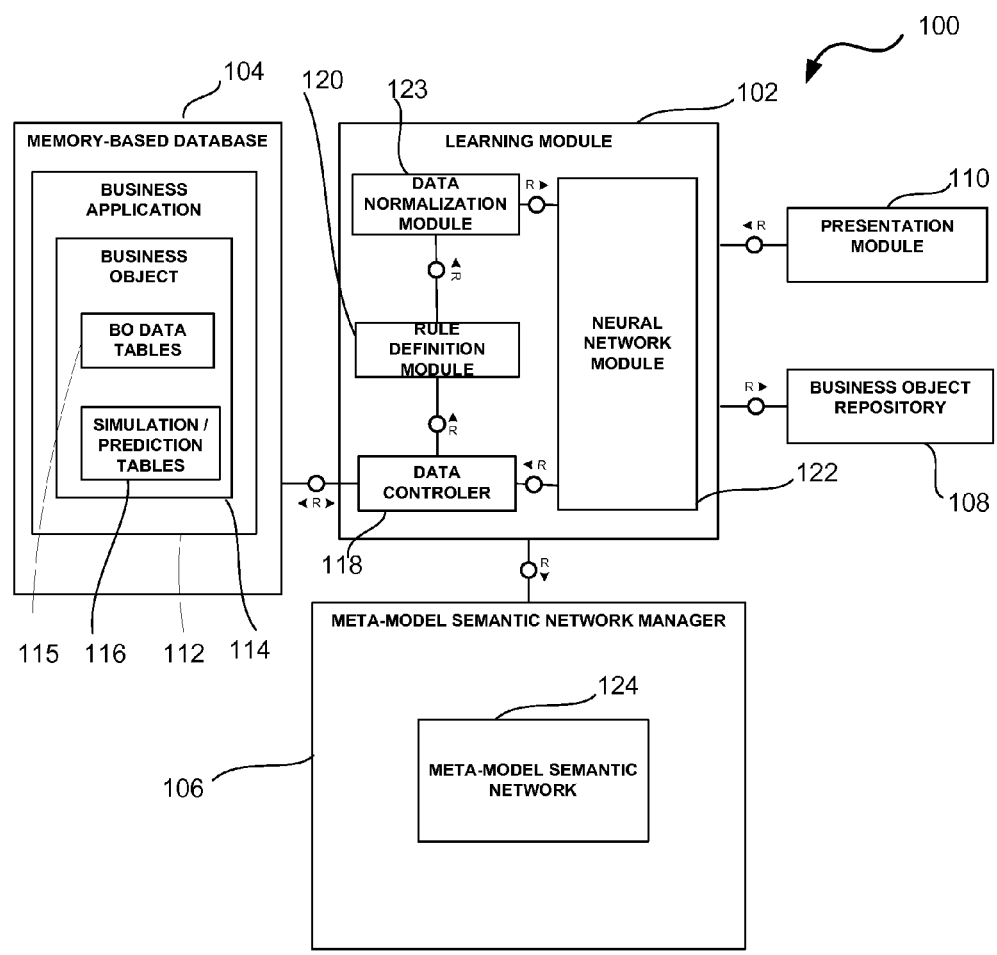
FIG. 1 is a block diagram depicting an architectural overview of a system for simulating enterprise operations, in accordance with an example embodiment.

As used herein a "business object," may refer to a representation of a business entity, such as an employee or a sales order, in an enterprise system. That is, a business object is a type of entity inside the business layer in an n-layered architecture of object-oriented computer programs. A business object encompasses both the functions (in the form, of methods) and the data (in the form of attributes) of this business entity.

When searching, for example, business objects, a typical search engine may simply search the attributes associated with business objects. For example, in response to receiving a query for "employees located in San Diego," the typical search engine may return a business object of a company with a name of "San Diego Surf Shop" because the business object of the company has an attribute containing "San Diego." However, this is not what the user wants because the business record is not an employee, nor is the company even located in San Diego. As a result, many of these conventional search engines are notoriously inaccurate at searching for enterprise data containing keywords with meanings that depend on the context of the attribute. By relating semantic labels (e.g., "location") to enterprise data (e.g., address data fields), certain embodiments enable improved database searches and related model building for enterprise data systems.

In some operational settings, a meta-model semantic network may be employed to associate semantic labels with enterprise data and enable related searches. For example, a business application may store an instance of a business object related to a particular employee. Such a business object may be associated with a definition. In some embodiments, a meta-model associated with the definition is created to provide semantic information regarding the particular business object. Embodiments may then be used to extract the business object from the business application to generate semantic objects and semantic relations that are stored in the meta-model semantic network. After the meta-model semantic network contains the semantic objects and semantic relations associated with the business object, the meta-model semantic network may then be used to search the business object in a meaningful manner.

"Enterprise data," as used herein, may refer to data maintained by an enterprise, such as a business, individual, group, or any other organization. Examples of enterprise data include, for example, business objects, business documents, notes, bookmarks, annotations, terminology, or any other business concept. In some embodiments, the enterprise data may be extracted from heterogeneous sources (e.g., an email database server and a purchase order database). Further, the enterprise data may be structured (e.g., type defined via a schema, such extensible markup language (XML)) or unstructured (e.g., word documents).

As used herein, a "semantic network" may refer to a network of semantic objects connected through semantic relations. A "semantic object," as used herein, may refer to a conceptual representation of a notion recognized by an enterprise, such as a product, person, employee, customer, business, document, case, project, business object, term, or any other suitable data. A "semantic relation," as used herein, may refer to a relationship between two or more semantic objects. Such relationships may have attributes and a type or definition that provides a conceptual meaning to how the two or more semantic objects are related to each other.

As used herein, a "meta-model semantic network" may refer to a semantic network generated based on a meta-model of the enterprise data. A "meta-model," as used herein, is a model that characterizes the conceptual meaning of elements of a business object definition. In turn, a "model" is a characterization of instances of an enterprise data. A definition of a business object is an example of a model. The definition may model an instance by defining the attributes (e.g., an address) associated with the business object. The meta-model then models these attributes and gives meaning to attributes (e.g., an address is a location).

"Semantic information," as used herein, may refer to information that provides conceptual meaning to enterprise data. Such semantic information may associate particular enterprise data with concepts maintained by an enterprise. For example, a collection of attributes (e.g., street, city, state, zip code, and the like) may be given a meaning of understanding (e.g., location). Such semantic information may be formally organized as "semantic object definitions" and "semantic relation definitions."

A "rule definition," as used herein, may refer to a set of rules that maps enterprise data to definitions of semantic objects and semantic relations. In an example embodiment, a rule definition may include tokens and expressions with types and meta-data information that maps enterprise data (e.g., an instance of a business object) to semantic information contained in a meta-model.

FIG. 1 is a block diagram depicting an architectural overview of a system 100 for conducting data searches determining related models in accordance with an example embodiment. The networked system 100 includes a learning module 102 that is in communication with a memory based database 104 that stores enterprise data, a meta-model semantic network manager 106 that provides access to semantic characterizations, a business object repository 108 that is a source of business objects containing data, and a presentation module 110 that accesses results from the learning module 102. Connections between network elements show directionality for nominal information requests (e.g., "R▶ ") although alternative information requests are also possible depending on the operational setting. These networked elements may be embodied, individually or in combination, in a computing device in the form of, for example, a personal computer, a server computer, or any other suitable computing device. In various embodiments, the computing device may be used to implement computer programs, logic, applications, methods, processes, or software to conduct a search using context information, as described in more detail below.

Typically the main-memory database 104 (also known as an in-memory database) uses main memory for data storage rather than disk storage, and as a result database access times are substantially faster than those for a conventional disk storage system. The memory-based database 104 includes at east one business application 112 that includes at least one business object 114. Although a single business application 112 with a single business object 114 is shown in the figure, multiple instances are typical for the memory-based database 104. Typically the business object 114 includes one or more business object (BO) data tables 115 that relate the business object 114 to relevant enterprise data and may optionally include simulation or prediction tables 116 that enable the simulation or prediction of enterprise data over some operational range for the business object. For example, the business object 114 may refer to a personnel unit (e.g., an individual employee or a group of employees) that is associated with one or more semantic labels (e.g., "telecommunications engineer," "high efficiency"). The BO tables 115 may include enterprise data related that personnel unit (e.g., time/cost to complete tasks of varying complexity), and the simulation or prediction tables 116 may include values to simulate or predict results for the personnel unit under various operational ranges (e.g., working under "high-pressure" conditions to complete a "high-priority" task with a prescribed budget, enterprise value related to additional education/training, etc.).

The learning module 102 includes a data controller 118 that communicates with the memory-based database 104, a rule-definition module 120, a neural-network module 122, and a data-normalization module 123. As discussed below, the data controller 118 controls access to the database 104 including read operations and write operations. The read operations may relate to data (e.g. input and output parameters) used in a learning phase with the neural-network module 122 and the write operations may relate to simulation/prediction tables 116 that are added to the database (e.g., as direct data entries or as compiled versions of prediction rules).

The rule-definition module 120 characterizes how values of the database 104 are accessed, for example, by associating data fields (e.g., values from BO tables 115 and simulation/prediction tables 116) with specific calculations or semantic labels. In general, these rules that define how the existing database values can be combined to build particular input parameters (e.g., thr the neural-network module 122). Rules may be imported or developed through the business object repository 108. The rules can be then compiled to give executable rules that are deployed on the memory-based database.

The neural-network module 122 implements machine learning for the database 104 by using accessed values from the database 104 to build models that relate semantic concepts under various operational settings (e.g., time/cost to complete tasks). Although a neural-network module 122 is illustrated in FIG. 1, example embodiments include machine learning with a variety of models including supervised networks (e.g., neural networks) and non-supervised networks (e.g., self-organizing maps).

The data-normalization module 123 enables normalization and scaling when models determined by the neural-network module 124 are used to define rules for accessing the database 104.

The learning module 102 may access the meta-model semantic network manager 106 to relate semantic labels with the business object 114. The meta-model semantic network manager 106 is designed to maintain the meta-model semantic network 124, which may be a semantic network that includes semantic objects and semantic relations that provide meaning to particular enterprise data, such as, for example, business objects, business documents, notes, bookmarks, annotations, terminology, or any other business concept or enterprise data used within the enterprise. For example, John Smith, as a concept within the enterprise, may be associated with various business objects (e.g., a sales order, employee record, customer record, or any other suitable business object) and with documents created or otherwise involving John Smith. Through the use of semantic labels, the learning module 102 may answer a variety of enterprise questions, such as who is working on a particular topic (e.g., using particular terminology), which documents are describing a sale of a particular material, which supplier offers a material that fulfils specified conditions, or any other suitable query.

These semantic characterizations may be developed by accessing data sources (e.g., crawler software applied to the database 104 or web sources) combined with textual analysis to determine semantic objects and relations. ("Semantic Related Objects," U.S. application Ser. No. 13/288,730, filed Nov. 3, 2011.) In this way, the definitions of enterprise data (e.g., business objects) may be extended at the meta-model level to provide semantic information. Such semantic information provides supplemental meaning to the elements, attributes, and relations between the business objects. As an example, the definition of an employee business object may be associated with an address. In some embodiments, such an address may be a field of the business object 114, and, in other embodiments, such an address may be represented by a separate business object. In this example, the employee definition may be extended, at the meta-model level, to give the address field the semantic meaning of location. That is, the association between the employee and the address characterizes the location of a particular employee.

In some embodiments, the learning module 102 may extract existing enterprise definitions (possibly including semantic labels) from the business object repository 108. For example, a source of business objects definitions in an SAP environment may be the SAP Enterprise Service Repository (ESR) or the SAP By-Design Model Repository. Once the business object definitions are extracted from the business object repository 108, a user interface provided by the presentation module 110 may enable an enterprise user to view and edit semantic labels related to the business objects 114. Information extracted from the business object repository 108 may also be stored in the rule-definition module 120 to define how fields of the database 104 are accessed for a given calculation with enterprise data.

Figure 2:
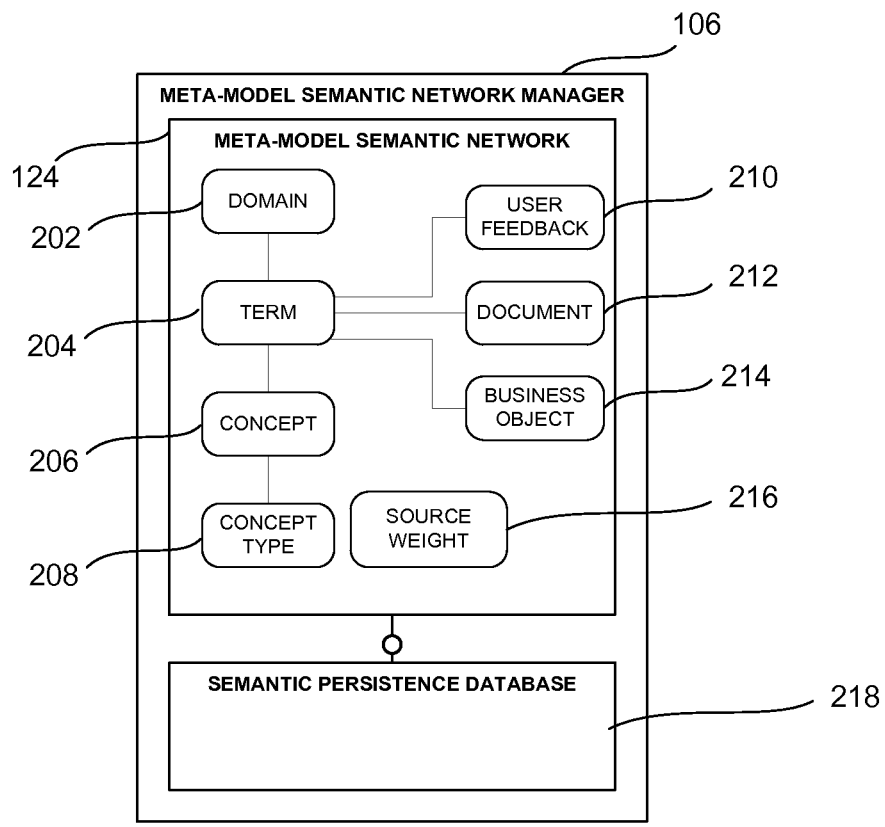
FIG. 2 is a block diagram showing a simplified meta-model semantic network, in accordance with an embodiment, for simulating enterprise operations.

FIG. 2 depicts a block diagram showing the meta-model semantic network manager 106 including a simplified meta-model semantic network 124, in accordance with an embodiment, for conducting searches using semantic objects. As FIG. 2 shows, the meta-model semantic network 124 includes nodes that link a term 204 to a domain 202 and a concept 206. In turn, the concept 206 may be linked to a concept type 208. Although FIG. 2 shows the nodes of the semantic network 124 as single entities, it is to be appreciated that meta-model semantic network 124 may include fewer or more nodes apart from those shown in FIG. 2. For example, a concept may be linked to one or more terms. Still further, additional and different nodes may be utilized by the meta-model semantic network 124.

The term 204 may be a word or phrase found in a business application, a document, the Internet or Web, or manually created by an end-user. The concept 206 may refer to a unit of meaning to which the term 204 refers to, such as a specific idea or notion. The concept 206 groups all the terms that are used to express this idea as synonyms. For example, a product may be associated with multiple product names. Accordingly, each of the product names may be stored as separate terms in the meta-model semantic network 124, all linked to the same product concept.

The domain 202 may associate the term 204 with a particular knowledge domain used within an enterprise. A collection of terms associated with a particular domain may then define the vocabulary used to describe concepts in a knowledge domain.

The concept type 208 may be metadata that characterizes the attributes associated with the concept 206. The concept type 208 may, for example, describe the attributes associated with the concept 206 for a particular product.

The meta-model semantic network 124 may also include nodes that relate the term 204 to enterprise data, such as a user feedback object 210, document 212, and business object 214. A user feedback object 210 may be any data embedded into enterprise data to provide further contextual data to the enterprise data. Notes, bookmarks, annotations, or any other user embedded data are examples of user feedback objects.

In some embodiments, the semantic relations between the term 204 and the nodes 210, 212, 214 may be influenced by a source weight 216. The source weight 216 may be a weighting factor that makes some relationships more relevant. In some embodiments, the source weight 216 may indicate that a node is more or less relevant based on the user feedback object 210. In other cases, a document 212 that merely mentions some of the attributes of a concept 206 may receive a lesser weight than a business object that includes much the relevant relations and attributes.

The semantic persistence database 218 may store different meta-model semantic networks 124. For example, a first meta-model semantic network may include semantic relations and semantic objects optimized to respond to queries directed to sales orders (e.g., who created a sales order, what suppliers provide a certain part, etc), while another meta-model semantic network may include semantic relations and semantic objects optimized to respond to queries related to finding experts in a domain.

Figure 3:
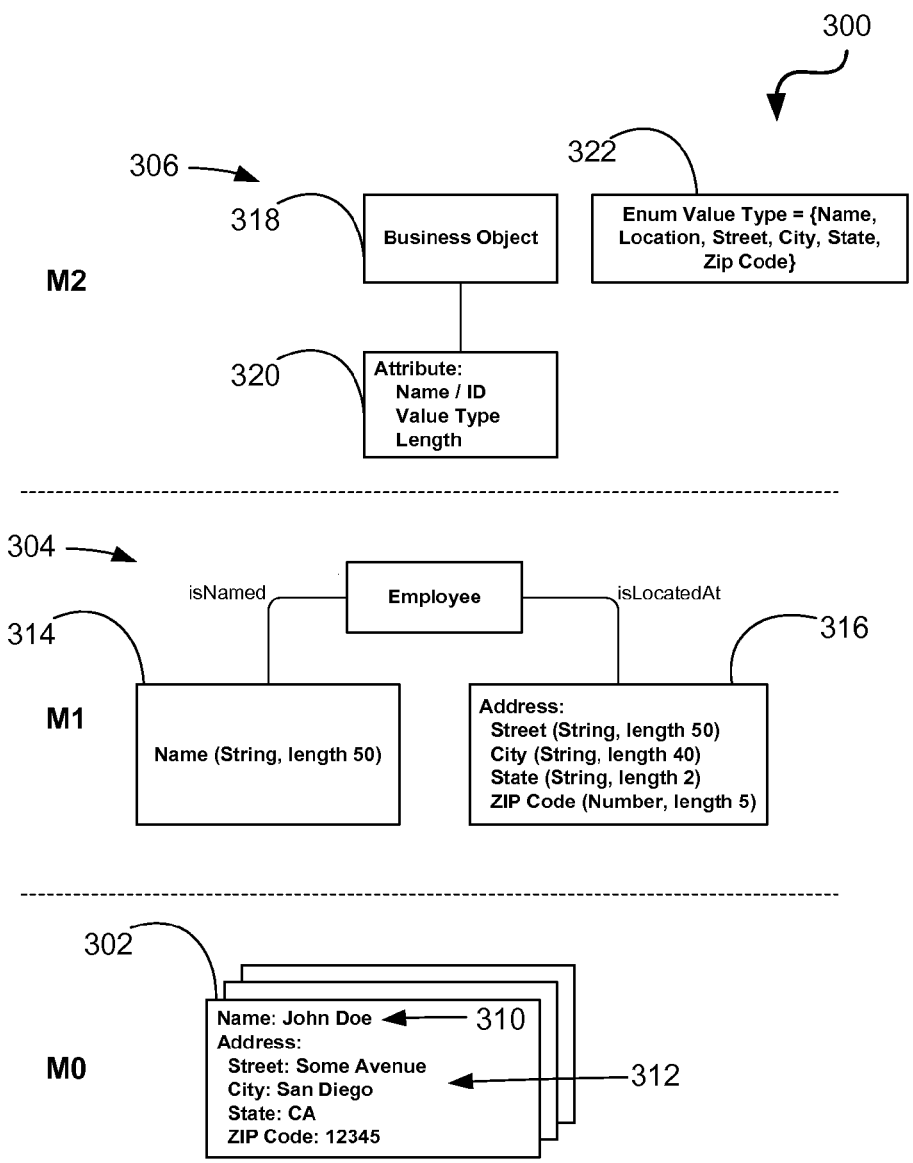
FIG. 3 is a diagram illustrating a simple example of a three level meta-object facility (MOF) structure, in accordance with an example embodiment.

In some embodiments, the meta-model semantic network 124 may be considered as a multi-layered structure. FIG. 3 is a diagram illustrating a simple example of a three level meta-object facility (MOP) structure 300, in accordance with an example embodiment.

At the M0 level, an instance 302 of a business object may be stored in, for example, the database 104 (e.g., in the business application 112 as shown in FIG. 1). The instance 302 may include a name attribute 310 that stores the string "John Doe." Further, the instance 302 may include an address attribute 312 that is a complex attribute type that stores sub-attributes that specify an address, such as a street, city, state, and zip code. It is to be appreciated that in some embodiments, the instance 302 does not include meta-data that indicates that name attribute 310 relates to a name. Nor, in other embodiments, does the instance include meta-data that indicates that the address attribute 312 relates to an address. Instead, the attributes 310, 312 merely include respective values. It is to be further appreciated that the types used herein to describe attributes 310, 312 are used merely for clarity of description. In other embodiments, the attributes 310, 312 may be represented as any suitable data type, such as a class, structure, reference, array, or pointer.

At the M1 level, an example of a model 304 of the business object is illustrated. As FIG. 3 shows, the model 304 shows, in formal representation, the structure of an instance of the Employee business object. As used herein, a model is formal where the model provides type definitions that are usable to a computer system. For example, a data type (e.g., a string data type) may define how the data is stored and the operations that may be applied thereto. However, a string data type, by itself, does not provide semantic meaning. That is, the model 304 lacks a conceptual meaning of the Name definition or the address definition.

Still at the M1 level, the model 304 defines that employee objects have a name attribute 314 through an is Named relationship. The name attribute 314 is defined to be a string data type, with length of 50. Further, the model 304 defines that employee objects have an address attribute 316 through an is LocatedAt relationship. The address attribute 316 is defined to be of a complex type with sub-attribute definitions, such as a street definition, city definition, state definition, zip code definition, each with a corresponding type definition and field length. As can be appreciated, the instance 302 is an instantiation of the model 304.

A meta-model is defined at the M2 level. The meta-model 306 defines the rules and constructs of how a model in the M1 level may be defined, such as model 304. For example, the meta-model 306 defines that a model of a business object 318 may include an association with an attribute 320. The attribute 320, in turn, is defined to include a name or identifier, value type, and length. As can be seen at the M1 level, without further definitions, the name attribute 314 is a valid instantiation of the attribute 320 because it contains the necessary elements defined in the attribute 320.

However, to provide semantic understanding to the model 304, the meta-model 306 may further define conceptual types 322. The conceptual types 322 may enumerate the concepts that may be used as value types in the attribute 320. The conceptual types 322 may correspond to the concepts in the meta-model semantic network 124.

Although not shown, it is to be appreciated by those skilled in the art that the meta-model may further include definitions of relationships that may be instantiated at the M1 level. For example, a business object may be associated with a relationship that includes, among other things, a name (e.g., is Named), direction (uni- or bi-directional), and relationship type (e.g., as may be enumerated by a relationship type).

With reference to FIG. 1, it should be appreciated that in other embodiments, the system 100 may include fewer or more components apart from those shown in FIG. 1. For example, in an alternate embodiment, the learning module 102 can be integrated with the meta-model semantic network manager 106. The components and respective modules shown in FIG. 1 may be in the form of software that is processed by a processor. In another example, as explained in more detail below, the components and respective modules shown in FIG. 1 may be in the form of firmware that is processed by application specific integrated circuits (ASIC), which may be integrated into a circuit board. Alternatively, the components and respective modules shown in FIG. 1 may be in the form of one or more logic blocks included in a programmable logic device (for example, a field programmable gate array). The components and respective modules shown in FIG. 1 may be adapted, and/or additional structures may be provided, to provide alternative or additional functionalities beyond those specifically discussed in reference to FIG. 1. Examples of such alternative or additional functionalities will be discussed in reference to the flow diagrams discussed below.

Figure 4:
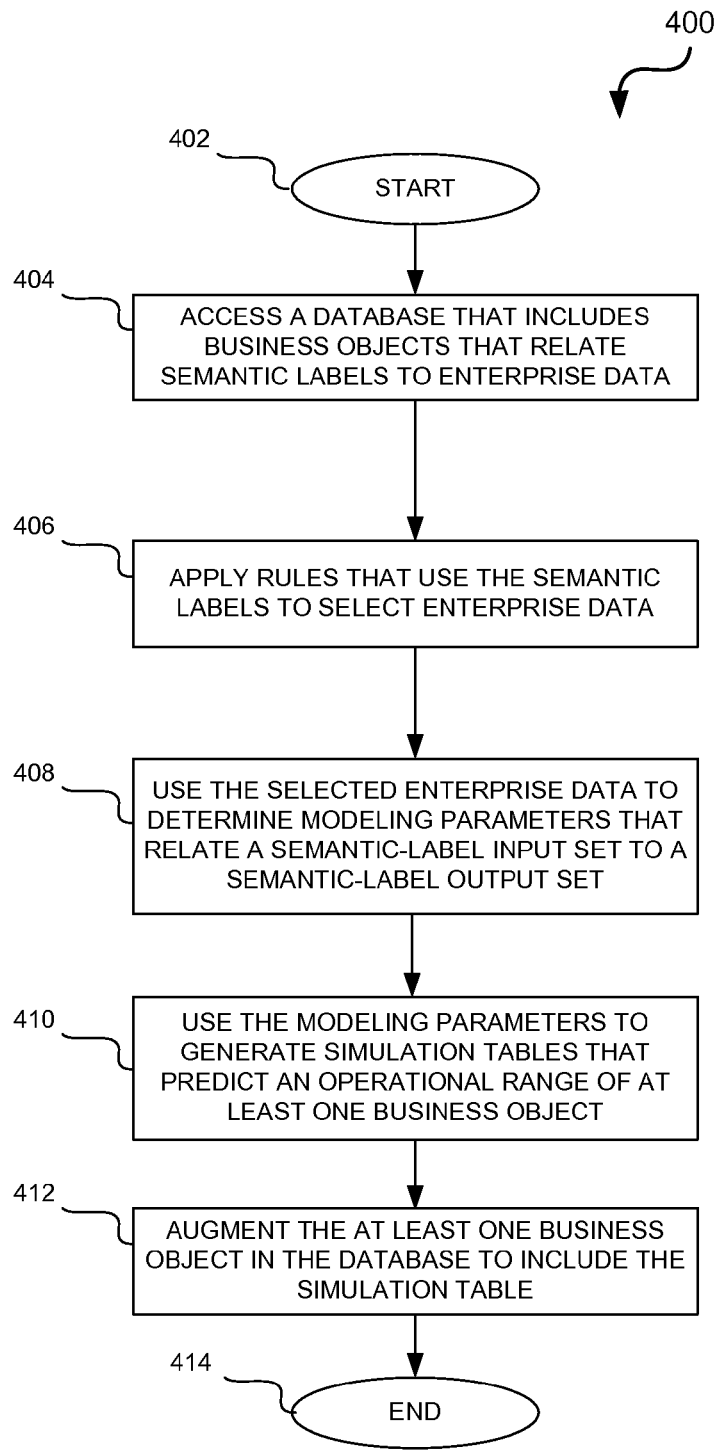
FIG. 4 depicts a flow diagram of a general overview of a method of simulating enterprise operations and augmenting an enterprise database based on the simulation results, in accordance with an embodiment.

FIG. 4 depicts a flow diagram of a general overview of a method 400, in accordance with an embodiment, of simulating enterprise operations and augmenting the database 104 of FIG. 1 based on the simulation results. In an example embodiment, the method 400 may be implemented by the learning module 102 included in the system 100 of FIG. 1.

With reference to FIG. 4, the method 400 may begin at operation 402. Then, at operation 404, the learning module 102 of FIG. 1 may access the database 104 of business objects 114 that include enterprise data, where the business objects 114 include data tables 115 that relate semantic labels to the enterprise data. For example, a business object may be a personnel unit such as an individual employee and semantic labels such as "engineer" and "marketing representative" may be used to distinguish enterprise data related to skill sets and work responsibilities of individual employees. Similarly, semantic labels such as "location" and "experience level" may further distinguish enterprise data corresponding to individual employees.

Then, at operation 406 the learning module 102 may apply one or more rules that use the semantic labels to select enterprise data corresponding to the semantic labels. For example, a rule may use the semantic labels for "engineer" and "location" to select enterprise data related to employs with certain skill sets in specific geographic locations.

Then, at operation 408 the learning module 102 may use the selected enterprise data to determine modeling parameters that relate a semantic-label input set to a semantic-label output set, where the semantic-label input set and the semantic-label output set each include at least one of the semantic labels. For example, the modeling parameters may relate semantic inputs related to personnel and equipment expenditures to semantic outputs related to the performance goal of a business operation. It should be appreciated that a variety of performance goals may be covered including profit related to a specific product or service as well as a broader definition that may include related products or services. Alternatively, market share for a product or service may be the critical performance goal. In some operational settings, a weighted combination (e.g., weighted sum) of performance goals may be used.

Then, at operation 410 the learning module 102 may use the modeling parameters to generate a simulation table that predicts an operational range of a business object 114 corresponding to at least one of the semantic labels. For example, the simulation table may predict how a mixture of personnel units (e.g., individual employees with certain characteristics including skill sets, costs, and locations) may contribute to some enterprise goal (e.g., for cost, profit, timing, etc.).

Then, at operation 412 the learning module 102 may augment the business object 114 in the database by including the simulation table in the business object 114. For example, the modeling parameters may define a prediction rule that predicts enterprise data for the at least one business object over the operational range. A tabular version of the prediction rule may be added to each corresponding business object 114 as a simulation/prediction table 116 of FIG. 1. In order to efficiently create automatic updates for the prediction rule in the database 104, each business object 114 may be augmented by adding a compiled version of the prediction rule to the database 104. Then, with automatic updates from its compiled version, the prediction rule can be used to predict enterprise data for the corresponding business object 114 when the business object 114 is accessed through a corresponding semantic label. In some embodiments, the prediction rule may be expressed as a weighted combination of database fields that are accessed through the semantic labels (e.g., a cost average for performing an enterprise task). The method may then end at operation 414.

The method 400 of FIG. 4 may be directed to simulating a variety of enterprise operations including, for example, the design, development or marketing of a product or service. In the case of a marketing campaign, the learning module 102 enables the calculation of dependencies between particular business elements including, for example, how the cost and activity of a marketing campaign influences the required capital and personnel investments as well as the short-term and long-term financial benefits. Furthermore, by linking models in sequence (e.g., cascading), the learning module 102 can use the results of one simulation result (e.g., simulation/prediction tables 116) to implement a second more complex simulation.

By updating the database 104 continuously (e.g., with a compiled version of a prediction rule) the learning module 102 effectively utilizes the capabilities of memory-based database systems and enables current business trends to be incorporated into current decisions. Frequent database updates can be especially desirable when implementing data-sensitive models (e.g., neural networks) that are relied upon to understand the relative significance of system elements for obtaining or optimizing the goals of the business enterprise.

Figure 5:
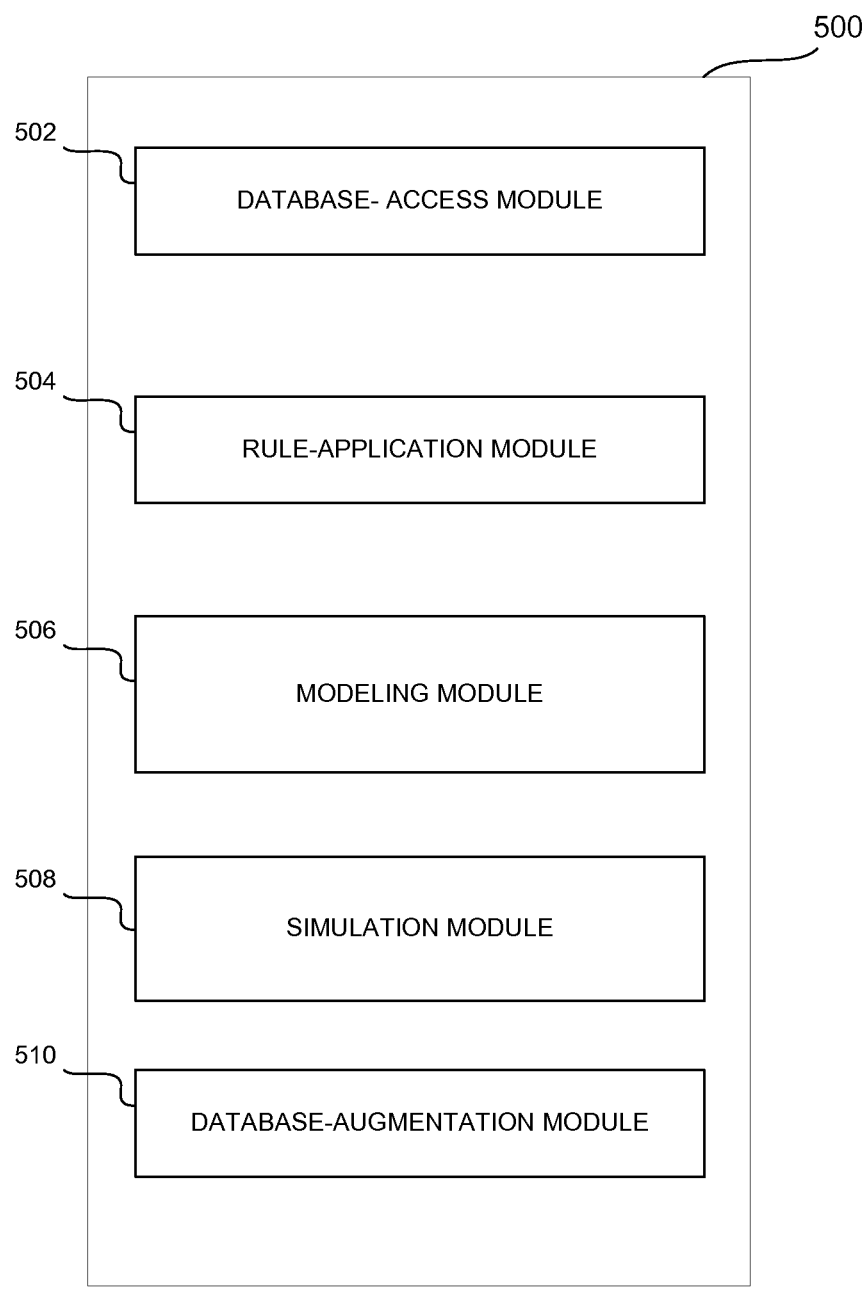
FIG. 5 depicts a block diagram of an apparatus related the embodiment of FIG. 4, in accordance with an embodiment.

FIG. 5 depicts a block diagram of an apparatus 500, in accordance with an example embodiment. In this case, the apparatus 500 includes at least one computer system (e.g., as in FIG. 6) to perform software and hardware operations for modules that carry out aspects of the method 400 of FIG. 4. In accordance with an example embodiment, the apparatus 500 includes a database-access module 502, a rule-application module 504, a modeling module 506, a simulation module 508, and a database-augmentation module 510. The database-access module 502 is configured to access a database of business objects that include enterprise data, where the business objects include data tables that relate semantic labels to the enterprise data. The rule-application module 504 is configured to apply one or more rules that use the semantic labels to select enterprise data corresponding to the semantic labels. The modeling module 506 is configured to use the selected enterprise data to determine modeling parameters that relate a semantic-label input set to a semantic-label output set, where the semantic-label input set and the semantic-label output set each include at least one of the semantic labels. The simulation module 508 is configured to use the modeling parameters to generate a simulation table that predicts an operational range of at least one business object corresponding to at least one of the semantic labels. The database-augmentation module 510 is configured to augment the at least one business object in the database by including the simulation table in the at least one business object.

Figure 6:
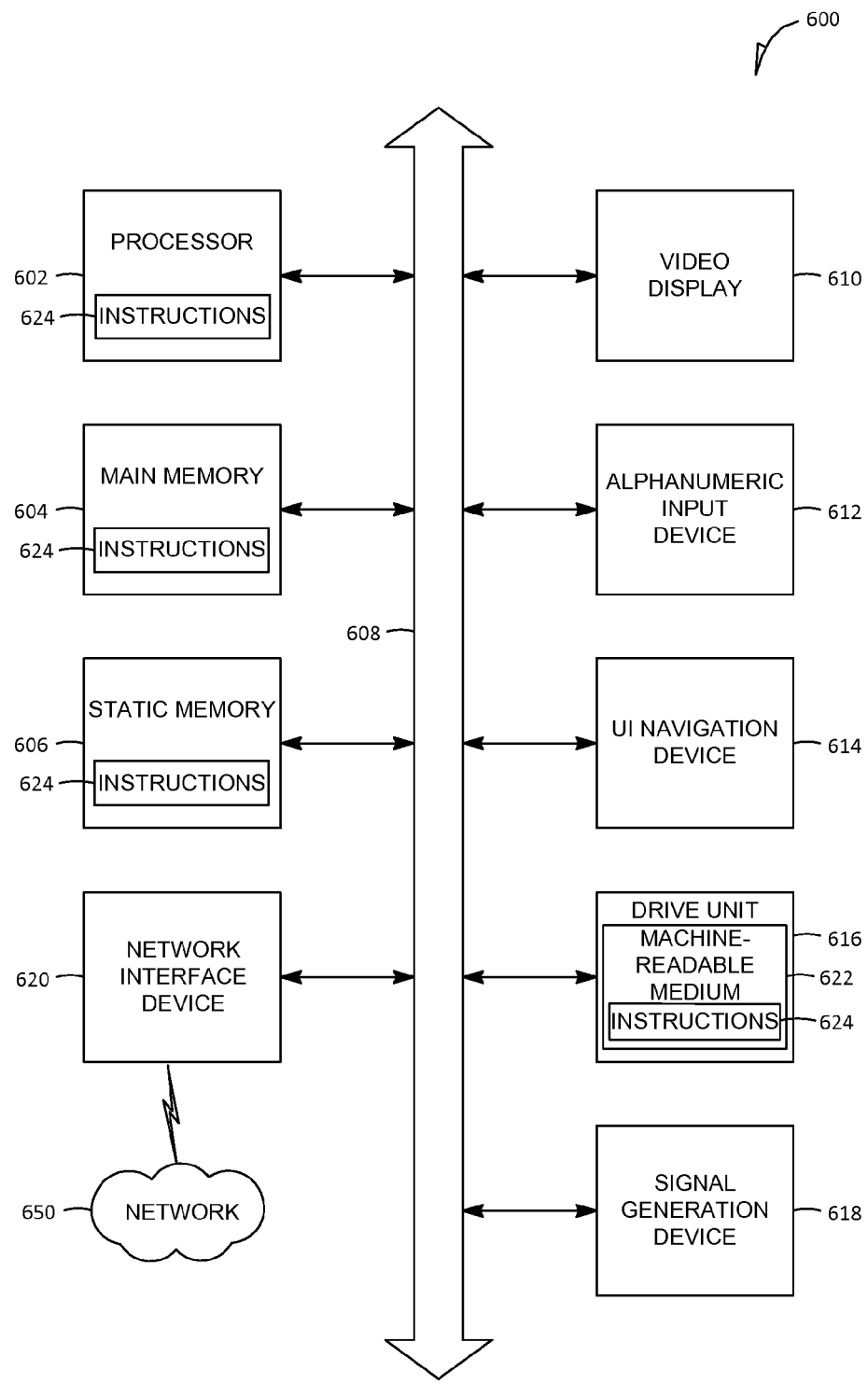
FIG. 6 a block diagram depicting a machine in the example form of a computing device within which may be executed a set of instructions for causing the machine to perform any one or more of the methodologies discussed herein.

FIG. 6 depicts a block diagram of a machine in the example form of a computing device 600 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 600 includes a processor 602 (e.g., a central processing unit (CPU), a graphics processing unit (GPU) or both), a main memory 604 (e.g., random access memory), and static memory 606 (e.g., static random-access memory), which communicate with each other via bus 608. The computing device 600 may further include video display unit 610 (e.g., a plasma display, a liquid crystal display (LCD) or a cathode ray tube (CRT)). The computing device 600 also includes an alphanumeric input device 612 (e.g., a keyboard), a user interface (UI) navigation device 614 (e.g., a mouse), a disk drive unit 616, a signal generation device 618 (e.g., a speaker), and a network interface device 620.

The disk drive unit 616 (a type of non-volatile memory storage) includes a machine-readable medium 622 on which is stored one or more sets of data structures and instructions 624 (e.g., software) embodying or utilized by any one or more of the methodologies or functions described herein. The data structures and instructions 624 may also reside, completely or at least partially, within the main memory 604 and/or within the processor 602 during execution thereof by computing device 600, with the main memory 604 and processor 602 also constituting machine-readable, tangible media.

The data structures and instructions 624 may further be transmitted or received over a computer network 650 via network interface device 620 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 600) or one or more hardware modules of a computer system (e.g., a processor 602 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 602 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 602 configured using software, the general-purpose processor 602 may be configured as respective different hardware modules at different times. Software may accordingly configure a processor 602, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 602 that are temporarily configured (e.g., by software) or permanently configured to perform the relevant operations. Whether temporarily or permanently configured, such processors 602 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 602 or processor-implemented modules. The performance of certain of the operations may be distributed among the one or more processors 602, not only residing within a single machine, but deployed across a number of machines. In some example embodiments, the processors 602 may be located in a single location (e.g., within a home environment, an office environment or as a server farm), while in other embodiments the processors 602 may be distributed across a number of locations.

While the embodiment(s) is (are) described with reference to various implementations and exploitations, it will be understood that these embodiments are illustrative and that the scope of the embodiment(s) is not limited to them. In general, techniques for data searches using context information may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method comprising:
accessing a database of business objects that include enterprise data, the business objects including data tables that relate semantic labels to the enterprise data;
applying one or more rules that use the semantic labels to select enterprise data corresponding to the semantic labels;
using the selected enterprise data to determine modeling parameters that relate a semantic-label input set to a semantic-label output set, the semantic-label input set and the semantic-label output set each including at least one of the semantic labels;
using the modeling parameters to generate a simulation table that predicts an operational range of at least one business object corresponding to at least one of the semantic labels; and
augmenting the at least one business object in the database by including the simulation table in the at least one business object.

2. The method of claim 1, wherein the modeling parameters define a neural network that relates the semantic-label input set to the semantic-label output set.

3. The method of claim 1, wherein
the modeling parameters define a prediction rule that predicts enterprise data for the at least one business object over the operational range, and
augmenting the at least one business object includes adding a compiled version of the prediction rule to the database.

4. The method of claim 1, wherein the modeling parameters define a prediction rule that predicts enterprise data for the at least one business object over the operational range, and the method further comprises:
using the prediction rule to predict enterprise data for the at least one business object when the at least one business object is accessed through a corresponding semantic label.

5. The method of claim 1, wherein the modeling parameters define a prediction rule that predicts enterprise data for the at least one business object over the operational range by relating a corresponding semantic label to data fields of the at least one business object.

6. The method of claim 1, wherein applying the one or more rules includes calculating weighted combinations of selected enterprise data.

7. The method of claim 1, wherein the at least one business object includes a first business object that corresponds to a personnel unit.

8. A non-transitory computer-readable storage medium that stores a computer program, the computer program including instructions that, when executed by a computer, cause the computer to perform operations comprising:
accessing a database of business objects that include enterprise data, the business objects including data tables that relate semantic labels to the enterprise data applying one or more rules that use the semantic labels to select enterprise data corresponding to the semantic labels;
using the selected enterprise data to determine modeling parameters that relate a semantic-label input set to a semantic-label output set, the semantic-label input set and the semantic-label output set each including at least one of the semantic labels;
using the modeling parameters to generate a simulation table that predicts an operational range of at least one business object corresponding to at least one of the semantic labels; and
augmenting the at least one business object in the database by including the simulation table in the at least one business object.

9. The non-transitory computer-readable storage medium of claim 8, wherein the modeling parameters define a neural network that relates the semantic-label input set to the semantic-label output set.

10. The non-transitory computer-readable storage medium of claim 8, wherein
the modeling parameters define a prediction rule that predicts enterprise data for the at least one business object over the operational range, and
augmenting the at least one business object includes adding a compiled version of the prediction rule to the database.

11. The non-transitory computer-readable storage medium of claim 8, wherein
the modeling parameters define a prediction rule that predicts enterprise data for the at least one business object over the operational range, and
the computer program further includes instructions that, when executed by the computer, cause the computer to perform operations comprising:

using the prediction rule to predict enterprise data for the at least one business object when the at least one business object is accessed through a corresponding semantic label.

12. The non-transitory computer-readable storage medium of claim 8, wherein the modeling parameters define a prediction rule that predicts enterprise data for the at least one business object over the operational range by relating a corresponding semantic label to data fields of the at least one business object.

13. The non-transitory computer-readable storage medium of claim 8, wherein applying the one or more rules includes calculating weighted combinations of selected enterprise data.

14. The non-transitory computer-readable storage medium of claim 8, wherein the at least one business object includes a first business object that corresponds to a personnel unit.

15. An apparatus comprising:
a computer; and
a computer-readable medium connected to the computer, the computer-readable medium storing computer-executable modules including:
   a database-access module configured to access a database of business objects that include enterprise data, the business objects including data tables that relate semantic labels to the enterprise data;
   a rule-application module configured to apply one or more rules that use the semantic labels to select enterprise data corresponding to the semantic labels;
   a modeling module configured to use the selected enterprise data to determine modeling parameters that relate a semantic-label input set to a semantic-label output set, the semantic-label input set and the semantic-label output set each including at least one of the semantic labels;
   a simulation module configured to use the modeling parameters to generate a simulation table that predicts an operational range of at least one business object corresponding to at least one of the semantic labels; and
   a database-augmentation module configured to augment the at least one business object in the database by including the simulation table in the at least one business object.

16. The apparatus of claim 15, wherein the modeling parameters define a neural network that relates the semantic-label input set to the semantic-label output set.

17. The apparatus of claim 15, wherein
the modeling parameters define a prediction rule that predicts enterprise data for the at least one business object over the operational range, and
augmenting the at least one business object includes adding a compiled version of the prediction rule to the database.

18. The apparatus of claim 15, wherein
the modeling parameters define a prediction rule that predicts enterprise data for the at least one business object over the operational range, and
the simulation module is further configured to use the prediction rule to predict enterprise data for the at least one business object when the at least one business object is accessed through a corresponding semantic label.

19. The apparatus of claim 15, wherein the modeling parameters define a prediction rule that predicts enterprise data for the at least one business object over the operational range by relating a corresponding, semantic label to data fields of the at least one business object.

20. The apparatus of claim 15, wherein applying the one or more rules includes calculating weighted combinations of selected enterprise data.

\* \* \* \* \*